A. A. DE LOACH.
SAWMILL DOG.
APPLICATION FILED MAY 12, 1909. RENEWED OCT. 30, 1911.
1,028,863.
Patented June 11, 1912.
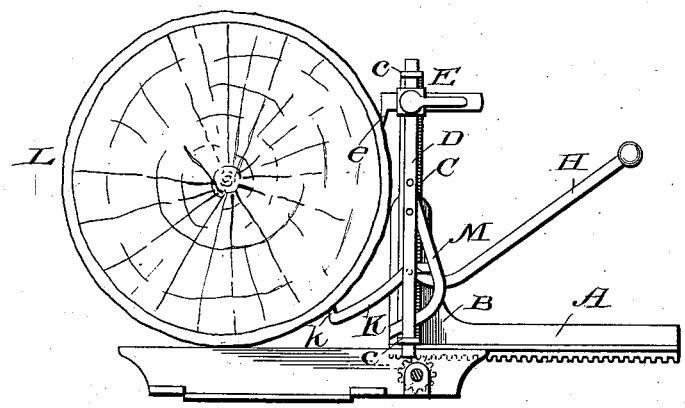
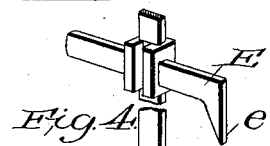
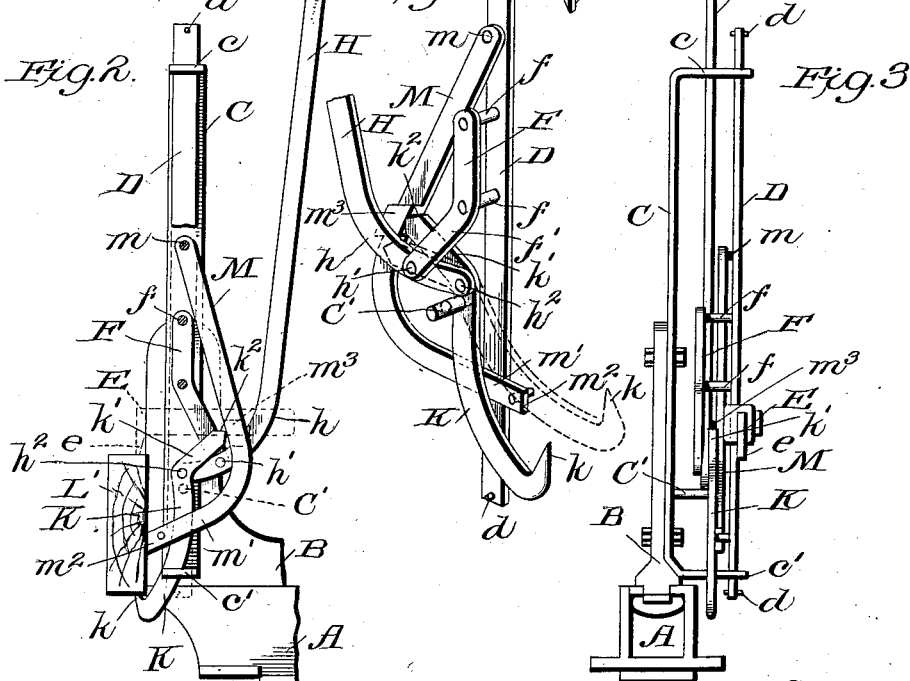
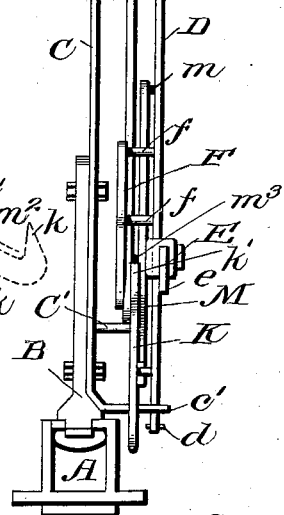

UNITED STATES PATENT OFFICE.

ALONZO A. DE LOACH, OF BRIDGEPORT, ALABAMA.

SAWMILL-DOG.

1,028,863.            Specification of Letters Patent.      Patented June 11, 1912.

Application filed May 12, 1909, Serial No. 495,407. Renewed October 30, 1911. Serial No. 657,623.

*To all whom it may concern:*

Be it known that I, ALONZO A. DE LOACH, a citizen of the United States, residing at Bridgeport, in the county of Jackson and State of Alabama, have invented certain new and useful Improvements in Sawmill-Dogs; and I do hereby declare the following to be a full, clear, and exact description of the invention, such as will enable others skilled in the art to which it appertains to make and use the same.

My present invention relates to improvements in saw-mill dogs, and relates especially to that class of dogs where both the upper and the lower dog bits are operated by the movement of a single lever.

My invention is especially intended to provide a simple and inexpensive form of dog which will grip either the round log or the squared timber, and will handle both with equal advantage, and in which the parts controlled by a single lever automatically adjust themselves when the said lever is thrown.

The invention will be understood by reference to the accompanying drawings, in which the same parts are indicated by the same letters throughout the several views.

Figure 1 is a main view showing the device used in gripping a round log. Fig. 2 is a similar view to Fig. 1, showing the device used in gripping squared timber, but parts being broken away for sake of clearness in the drawings. Fig. 3 is a front view of the complete device, and Fig. 4 is a fragmentary view showing the operation of the parts controlled by the lever.

A represents the head block, provided with the knee B, to which is rigidly attached the plate or bar C, which is bent over, as at $c$ and $c'$, and perforated to form a guideway for the sliding bar D, which bar is preferably provided with stop pins $d$. This bar D carries the top dog E, having the dog bit $e$, which dog is adjustably connected to the bar D.

F represents a bent bar, which is rigidly attached to the bar D, and is also spaced therefrom, by means of the studs $f, f$. To the end of this bar F is pivoted, as at $h'$, the operating lever H, which lever has its lower portion curved, as at $h$, and its lower end is pivoted, as at $h^2$, to the lower dog K, provided with the dog bit $k$.

M represents a curved pendulum bar pivoted, as at $m$, to the sliding bar D, and having its lower arm $m'$, terminating in the flat face $m^2$. This bar preferably swings between the sliding bar D and the operating lever H, which latter is mounted inside the pivot bar F, as shown most clearly in Fig. 3.

The pendulum bar M is provided with a lug $m^3$, shown most clearly in Fig. 4, and the lower dog K has an arm $k'$ projecting above its pivot, and the said arm terminates in two inclined faces $k^2$, as shown in Fig. 2. Thus it will be noted that the bar D carries the top dog E, the pendulum M and the pivot bar F, which pivot bar supports the lever H, and this lever supports the lower dog, so that all of the parts just mentioned are, in effect, supported by the bar D. The weight of these parts normally rests on the fixed heavy stud $C'$, shown most clearly in Fig. 3, which stud is connected to the plate C, and projects under the short arm of the lever H, as shown in Figs. 2, 3, and 4, but does not interfere with the swing of the lower dog K. When the round log is placed on the saw-mill carriage, and the lever H is pressed down, the parts will ultimately assume the position shown in Fig. 1, but in so doing the cycle of operations illustrated in Figs. 1 and 4 will occur.

The cant lever K, constituting the lower dog, is set with its head under the lug $m^3$ on the pendulum M, and the weight of the pendulum and of the longer arm of said lever K will normally hold the upper end of said cant lever K in engagement with the lug $m^3$, while all of the movable parts of the apparatus are supported on the fixed stud $C'$. Now if the lever H be swung backward, the dog bit $k$ will be swung upward, as indicated in dotted lines in Fig. 4, until it engages the under side of the log, as seen in Fig. 1. During this upward swing of the dog bit $k$, and especially after it bites into the log, the lever H, acting on its pivot $h'$ at a powerful leverage, will pull the bar D down in its guides, causing the upper dog bit $e$ to bite into the upper side of the log, and the log will be held securely between the two dog bits.

In order to use the device on squared timber, the timber is shoved up against the knee, pressing back the head $m^2$ of the pendulum bar M, and disengaging the arm $k'$ of the cant lever K from engagement with lug $m^3$, as shown in full lines in Fig. 4, and the upper dog is moved approximately in place, as indicated in dotted lines in Fig. 2. Now, if the lever H be thrown backward, it will pull down the bar D, causing the top dog bit to bite into the timber at the same time the lower dog bit will be pulled upward, and at a slight angle backward. This will tend to hold the timber firmly against the face of the knee. The reverse movement of the lever will release the dogs as before.

It will be noted that the movement of the single lever operates both the dogs, and that the parts are extremely simple in construction and operation, are not likely to get out of order, or to be injured by the rough usage to which apparatuses of this character are unavoidably subjected.

Having thus described my invention, what I claim and desire to secure by Letters Patent of the United States, is:—

1. An apparatus of the character described, comprising a sliding bar connected to the head block, a top dog adjustably mounted on said bar, a curved pendulum bar pivoted to said sliding bar, a pivot bar rigidly connected to said sliding bar, an operating lever pivoted to said pivot bar, a lower dog in the form of a bar provided with a hook at one end and an arm at the other end pivoted to said operating lever, the said arm being adapted to engage said pendulum bar with means carried by the head block for supporting the weight of the movable parts, substantially as described.

2. An apparatus of the character described, comprising a sliding bar connected to the head block, a top dog adjustably mounted on said bar, a curved pendulum bar pivoted to said sliding bar, a pivot bar rigidly connected to said sliding bar, an operating lever pivoted to said pivot bar, a lower dog in the form of a bar provided with a hook at one end and an arm at the other end pivoted to said operating lever, the said arm being adapted to engage said pendulum bar and a stud projecting from the head block and supporting the weight of the movable parts, substantially as described.

3. An apparatus of the character described, comprising a sliding bar connected to the head block, a top dog adjustably mounted on said bar, a curved pendulum bar pivoted to said sliding bar, a lug on said bar, a pivot bar rigidly connected to said sliding bar, an operating lever pivoted to said pivot bar, a lower dog in the form of a bar provided with a hook at one end and an arm at the other end pivoted to said operating lever, the said arm engaging said lug, with means carried by the head block for supporting the weight of the movable parts, substantially as described.

4. An apparatus of the character described, comprising a sliding bar connected to the head block, a top dog adjustably mounted on said bar, a curved pendulum bar pivoted to said sliding bar, a lug on said bar, a pivot bar rigidly connected to said sliding bar, an operating lever pivoted to said pivot bar, a lower dog in the form of a bar provided with a hook at one end and an arm at the other end pivoted to said operating lever, the said arm engaging said lug, and a stud projecting from the head block and supporting the weight of the movable parts, substantially as described.

5. An apparatus of the character described, comprising a sliding bar connected to the head block, a top dog adjustably mounted on said bar, an operating lever connected to said sliding bar, a lower dog provided with a hook at one end pivoted to said operating lever, with a lug carried by the head block and projecting beneath the lower end of the operating lever for supporting the weight of the movable parts, substantially as described.

6. An apparatus of the character described, comprising a sliding bar connected to the head block, a top dog adjustably mounted on said bar, a pivot bar rigidly connected to said sliding bar, an operating lever pivoted to said pivot bar, a lower dog provided with a hook at one end pivoted to said operating lever, and a stud projecting from the head block and supporting the weight of the movable parts, substantially as described.

In testimony whereof, I affix my signature, in presence of two witnesses.

ALONZO A. DE LOACH.

Witnesses:
C. P. CAMPBELL,
FRED ROBINSON.

---

Copies of this patent may be obtained for five cents each, by addressing the "Commissioner of Patents, Washington, D. C."